US008374822B2

(12) United States Patent
Grabarnik et al.

(10) Patent No.: US 8,374,822 B2
(45) Date of Patent: Feb. 12, 2013

(54) EXPERIMENT PARAMETERS FOR WALD'S SEQUENTIAL TESTS BASED ON CONTINUED FRACTIONS

(75) Inventors: Genady Grabarnik, Scarsdale, NY (US); Yefim H. Michlin, Nesher (IL); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 12/619,054

(22) Filed: Nov. 16, 2009

(65) Prior Publication Data

US 2011/0119030 A1    May 19, 2011

(51) Int. Cl.
*G06F 17/18*    (2006.01)
(52) U.S. Cl. ............. 702/181; 702/58; 702/82; 345/628
(58) Field of Classification Search ............... 702/58, 702/59, 81, 90, 181, 185, 82; 345/628
See application file for complete search history.

(56) References Cited

PUBLICATIONS

Michlin et al., Comparison Sequential Testing for Reliability: Exact Computation of OC and ASN, Proceedings of the 5th International Conference Relstat'05, pp. 295-303.
Michlin et al., Sequential Testing for Comparison of the Mean Time Between Failures for Two Systems, IEEE Transactions of Reliability, vol. 56, No. 2, Jun. 2007, pp. 321-331.
Military Handbook, Reliability Test Methods, Plans, and Environments for Engineering Development, Qualification, and Production, MIL-HDBK-781, Jul. 14, 1987, pp. 1-375.
Chikara Uno, Sequential Estimation of the Ratio of Scale Parameters in teh Exponential Two-Sample Problem J. Japan Statist. Soc. vol. 33, No. 2, 2003, 231-244.
Michlin et al., Test Duration in Choice of Helicopter Maintenance Policy, Reliability Engineering and System Safety 86 (2004) 317-321.
Y.H. Michlin, Sequential Evaluation of QNDE Devices for Underground Storage Tanks, Review of Progress in Quantitative Nondestructive Evaluation vol. 22, NY: AIP, 2002, pp. 907-914.
Michlin et al. Comparison Sequential Testing for Reliability: Optimal Truncation of Short Tests. Abstract. JSM 2007 Online Program. http://www.amstat.org/meetings/jsm/2007/onlineprogram/index.cfm?fuseaction=abstract_details&abstractid=310287.

*Primary Examiner* — Mohamed Charioui
*Assistant Examiner* — Paul D Lee
(74) *Attorney, Agent, or Firm* — Ryan, Mason & Lewis, LLP

(57) ABSTRACT

Test characteristics are determined at vertices of a rectangle defined on a sequential probability ratio test plot of a number of failures of a new physical system versus a number of failures of a baseline physical system. Based on the test characteristics, errors of first and second order are approximated as planes. Based on the approximating, intercepts of accept and reject boundaries are estimated. Based on slopes of the planes and actual values of the errors of the first and second orders, a starting point is determined on a graph of values of an intercept of the reject boundary and values of an intercept of the accept boundary. A minimum of an operating characteristic function is determined by alternative advances, commencing at the starting point, parallel to an axis representing the accept boundary intercept and an axis representing the reject boundary intercept.

24 Claims, 13 Drawing Sheets

TEST PLANE

RDP – REJECT DECISION POINT
ADP – ACCEPT DECISION POINT
TA – TRUNCATION APEX

TEST PLANE

RDP – REJECT DECISION POINT
ADP – ACCEPT DECISION POINT
TA – TRUNCATION APEX

TWO PROJECTIONS OF $\alpha_{real}$ AND $\beta_{real}$ "PLANES"

TWO PROJECTIONS OF $R_{ASN}$ "PLANE"

EXPERIMENT PARAMETERS FOR WALD'S SEQUENTIAL TESTS BASED ON CONTINUED FRACTIONS

FIELD OF THE INVENTION

The present invention relates to the computer and data processing arts, and, more particularly, to analytics and optimization applications and the like.

BACKGROUND OF THE INVENTION

Design of experiments is a widely used approach to identification of the statistical properties of a system. The sequential probability ratio test (SPRT) is a specific sequential hypothesis test. It was developed by Abraham Wald. Sequential hypothesis testing is a form of statistical analysis wherein the sample size is not fixed in advance; rather, data is evaluated as it is collected, and further sampling is stopped in accordance with a pre-defined rule when significant results are observed.

Wald's suggestion was to take into account the results of the previous experiments, which resulted in the sequential testing. In many cases there is interest in comparison of two systems (for example, a new system and a basic system) in order to determine whether the new system behaves significantly better in a statistical sense.

Design of experiments finds its application, for example, in identification of chip yield (more generally, in manufacturing quality control), in the testing of human examinees, and statistical properties of individual tasks of processes, such as those of an enterprise. The standard approach to the problem of design of experiments for Wald's sequential tests is to run experiments with all different possible values of the test parameters in order to define characteristics of the test.

SUMMARY OF THE INVENTION

Principles of the present invention provide techniques for design of experiment parameters for Wald's sequential tests based on continued fractions. In one aspect, an exemplary method (which can be computer implemented) includes the steps of determining test characteristics at vertices of a rectangle defined on a sequential probability ratio test plot of a number of failures of a new physical system versus a number of failures of a baseline physical system; based on the test characteristics, approximating errors of first and second orders as planes; and based on the approximating step, estimating intercepts of accept and reject boundaries. Furthermore, the method includes, based on slopes of the planes and actual values of the errors of the first and second orders, determining a starting point on a graph of values of an intercept of the reject boundary and values of an intercept of the accept boundary; and determining a minimum of an operating characteristic function by alternative advances, commencing at the starting point, parallel to an axis representing the accept boundary intercept and an axis representing the reject boundary intercept.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a computer readable storage medium (or multiple such media).

One or more embodiments of the invention may offer one or more technical benefits; for example, reducing the required number of tests.

These and other features, aspects and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
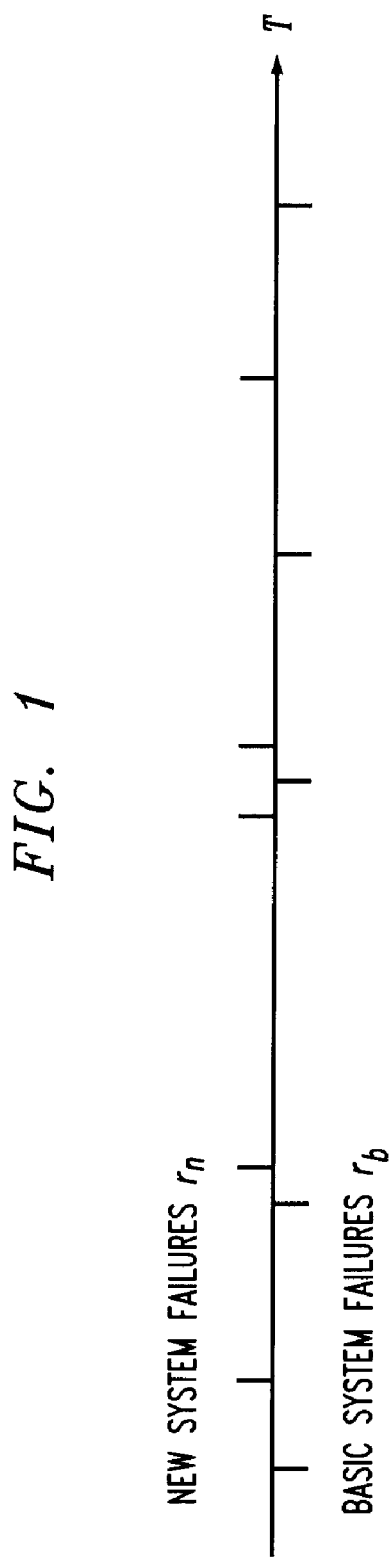
FIG. 1 shows an exemplary comparison of new and basic system failures.

A framework and system are provided for the effective choice of test boundaries for sequential testing based on the theory of continued fractions. In one or more instances, parameters for sequential testing are optimally determined; for example, for comparison testing of systems with unknown mean time between failures (MTBF). As appropriate, fractal properties are taken into account. One or more embodiments of the invention provide a procedure, based on application of the theory of continued fractions, which makes it possible to choose appropriate inter-step intervals in the search for the optimal test boundaries. These intervals have to differ for the "accept" and "reject" boundaries, and to depend on the truncation level or on the distribution of the sample number up to the decision. Aspects of the invention provide enhanced or even optimal choice of the search for the optimal parameters for the design of experiments systems, and/or optimal boundary locations.

A truncated Sequential Probability Ratio Test (SPRT) was studied with a view to checking the hypothesis on the ratio of the Mean Time Between Failures (MTBF) of two systems with exponential distributions of time between failures (TBF). It has been determined that in one or more embodiments, the basic test characteristics $\alpha$, $\beta$, and $R_{ASN}$ depend monotonically on the absolute terms in the equations of the oblique test boundaries. More precisely, based on the theory of continuous fractions, it has been established that in one or more embodiments, the jumps in the values of real parameters alpha and beta, as well as a graphical representation ("picture") of the jumps, behave one-side-continuously. At the search limits for these absolute terms, these dependences are almost planar, and in narrow intervals of variation of the terms, they are stepwise. These and other established regularities yield effective techniques for determining the optimal location of the test boundaries. The links that were found between the input and output characteristics of the test, and the fast-working technique for its planning, permit improvement of the planning methodology and its extension to all binomial truncated SPRT.

Aspects of the invention address simultaneous testing of two systems, referred to as "basic" (subscript b) and "new" (subscript n) respectively, with an exponential distribution of their times between failures (TBFs). A hypothesis is checked whereby the $MTBF_n/MTBF_b$ ratio equals a given value, versus the alternative whereby the ratio is smaller than the given value. The need for comparison testing is due to the fact that the MTBF of the basic system is often unknown. Moreover, simultaneous testing permits elimination of uncontrollable factors. In the paper "Comparison Sequential testing for Reliability: Exact Computation of OC and ASN," Y. H. Michlin and G. Grabarnik, Proc. of the $5^{th}$ Int'l. Conf. (RelStat '05) Part 2., Reliability and Statistics in Transportation and Communication v. 7 n. 2 (Riga October 2005 published 2006), devoted to sequential testing of binomial processes or processes reducible to binomial processes, it was mentioned that the error probabilities of the first and the second kind are incapable of analytical formulation but have a discrete nature. Hence, choosing the optimal testing parameters requires a search for extremes over discrete sets.

The optimal oblique test boundaries were searched for within the given range. Standard search programs for minima operate poorly, or not at all, with discrete data of the type in question. Refer now to FIG. 1. The upward tick marks represent failures of the new system while the downward tick marks represent failures of the basic system. Time is common to both systems. In the proposed test, the two systems that are being compared operate simultaneously. When one of them fails, it is immediately taken care of and a decision is made regarding continuing the test or stopping with acceptance or rejection of the null hypothesis (final decision).

Consider:

$H_0$: $\Phi \geq \Phi_0$; (for $\Phi = \Phi_0$ probability of accepting $H_0$ is $P_a(\Phi_0) = 1 - \alpha$)

$H_1$: $\Phi < \Phi_0$; (for $\Phi = \Phi_1$ probability of accepting $H_0$ is $P_a(\Phi_1) = \beta$) (1)

where:
$\Phi = \theta_n / \theta_b$
$\theta_n = MTBF_n$
$\theta_b = MTBF_b$
$\Phi_1 = \Phi_0 / d$
$d > 1$ is the discrimination ratio.

Figure 13A:
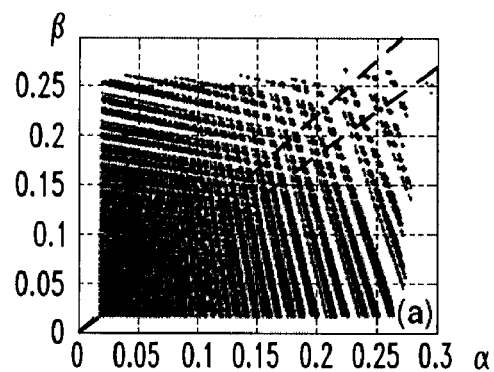
FIGS. 13A-13C show exemplary solution discreteness.
Figure 13B:
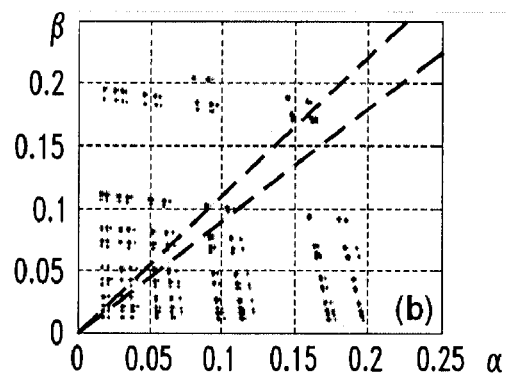
Figure 13C:
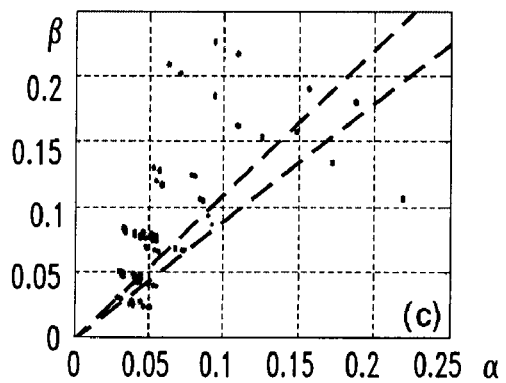

Discreteness of the solution is depicted in FIGS. 13A-13C. FIG. 13A shows points of possible $\alpha/\beta$ pairs for d=2, with truncation at $r_{nMax} = 12*ASN(\Phi_0)$, a situation that is practically without truncation. FIG. 13B shows points of possible $\alpha/\beta$ pairs for d=7.1, with truncation at $r_{nMax} = 12*ASN(\Phi_0)$, again, practically without truncation. FIG. 13C shows points of possible $\alpha/\beta$ pairs for d=7.1, with truncation at $r_{nMax} = 1.58*ASN(\Phi_0)$, representing drastic truncation.

Figure 2:
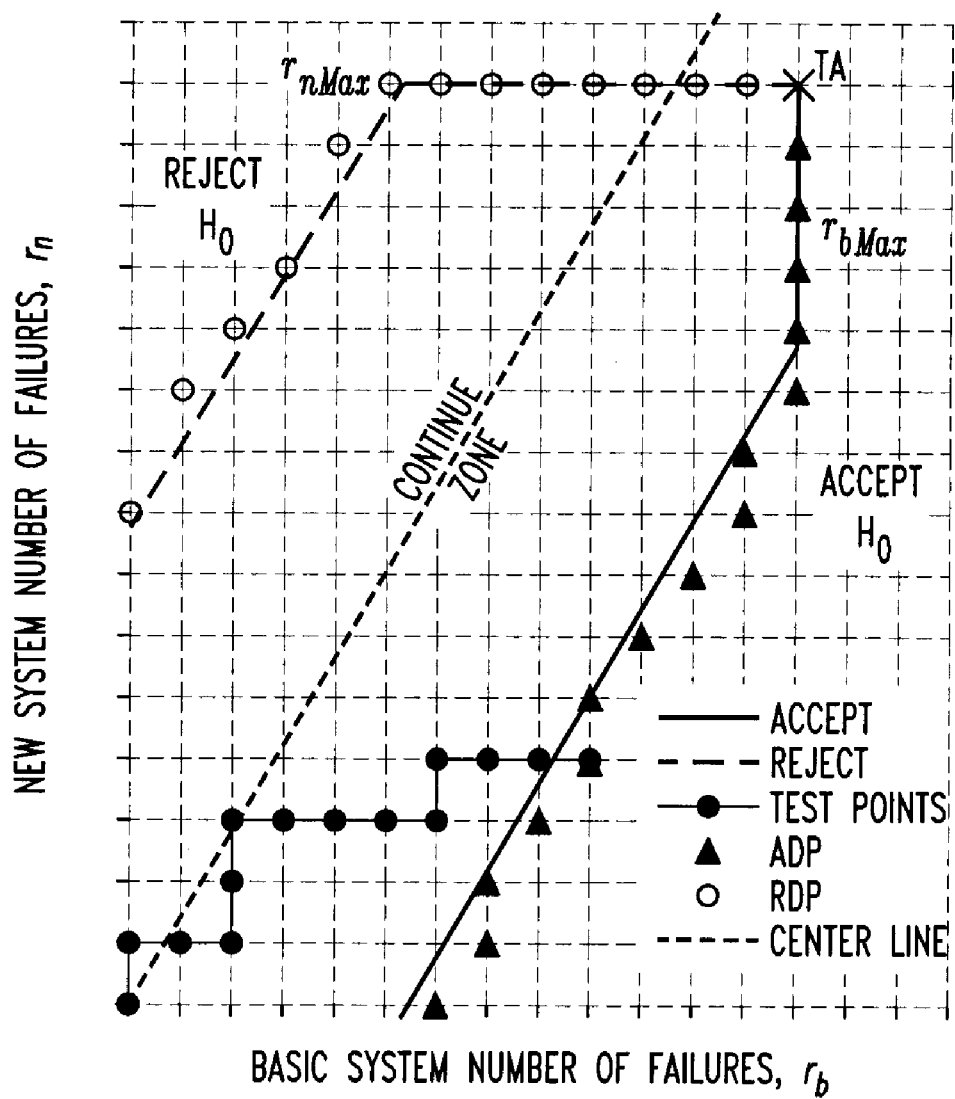
FIG. 2 shows an exemplary test plane.

With reference to FIG. 2, in this test, $\Phi$ is evaluated as:

$$\hat{\Phi} = (T/r_n)/(T/r_b) = r_b/r_n \quad (2)$$

$r_b$ and $r_n$ being the respective number of failures up to time T. The probability of failure of the new system is:

$$P_R(\Phi) = 1/(1+\Phi) \quad (3)$$

The probability of reaching the given test point $(r_b, r_n)$ is:

$$P_{r_b,r_n}(\Phi) = P_{r_b,r_n-1}(\Phi) P_R(\Phi) + P_{r_b-1,r_n}(\Phi)(1 - P_R(\Phi)) \quad (4)$$

The probability $P_a(\Phi)$ (Operating Characteristic or OC) is the sum of all the components $P_{ADP}(r_n, \Phi)$ of reaching all ADPs; hence, $\alpha$ and $\beta$ are obtainable from the pair of expressions:

$$\alpha = 1 - P_a(\Phi_0); \quad \beta = P_a(\Phi_1) \quad (5)$$

The average sample number (ASN) is given by:

$$ASN(\Phi) = \sum_{r_b=0}^{r_{bMax}} r_{SRDP}(r_b) P_{RDP}(r_b, \Phi) + \sum_{r_n=0}^{r_{nMax}} r_{SADP}(r_n) P_{ADP}(r_n, \Phi) \quad (6)$$

$$r_{SRDP}(r_b) = r_b + r_{nRDP}(r_b) \qquad r_{SADP}(r_n) = r_n + r_{bADP}(r_n)$$

For such a system, a Sequential Probability Ratio Test is available, where the decisions are demarcated as straight lines with parameters dependent on $(\Phi_0, \alpha)$ and $(\Phi_1, \beta)$. The skilled artisan will be familiar with same from, for example, A. Wald, *Sequential Analysis*, New York, John Wiley & Sons, 1947. As noted earlier, these relationships have a shortcoming; namely, to obtain the sought-for $\alpha$ and $\beta$, it is necessary to substitute in the boundary formulae values of $\alpha^*$ and $\beta^*$, whose exact dependences on $\alpha$, $\beta$, $\Phi_0$ and $\Phi_1$ are unavailable, as per Wald's aforementioned textbook and B. Eisenberg and B. K. Ghosh, The Sequential Probability Ratio Test, In: *Handbook of Sequential Analysis*/Ed. by B. K. Ghosh and P. K. Sen, New York: Marcel Dekker; 1991, pp. 47-66.

The "Accept" line is given by:

$$r_b = r_n/s + h_b' \quad (7)$$

The "Reject" line is given by:

$$r_n = s \cdot r_b + h_n \quad (8)$$

where:

$$s = -\frac{\ln(1+\Phi_0) - \ln(d+\Phi_0)}{\ln(1+\Phi_0) - \ln(d+\Phi_0) + \ln(d)} \quad (9)$$

$$h_b' = -h_a/s \quad (10)$$

$$h_a = \frac{\ln(\beta^*) - \ln(1-\alpha^*)}{\ln(1+\Phi_0) - \ln(d+\Phi_0) + \ln(d)} \quad (11A)$$

$$h_n = \frac{\ln(1-\beta^*) - \ln(\alpha^*)}{\ln(1+\Phi_0) - \ln(d+\Phi_0) + \ln(d)} \quad (11B)$$

As the skilled artisan will appreciate, given the teachings herein, and considering Wald's aforementioned textbook, $Pa(\Phi)$ (the OC) and $ASN_{nTr}(\Phi)$ of a non-truncated SPRT are obtainable in parametric form as per:

$$\Phi(h) = \frac{d^h \cdot (1+\Phi_0)^h - (d+\Phi_0)^h}{(d+\Phi_0)^h - (1+\Phi_0)^h} \quad (12)$$

$$P_a(h) = (A^h - 1)/(A^h - B^h) \quad (13)$$

$$ASN_{nTr}(h) = \frac{(1+\Phi(h)) \cdot [P_a(h) \cdot \ln B + (1 - P_a(h)) \cdot \ln A]}{(1+\Phi(h)) \cdot [\ln(1+\Phi_0) - \ln(d+\Phi_0)] + \ln d} \quad (14)$$

where:

$$A = (1-\beta_{real})/\alpha_{real} \quad (15)$$

$$B = \beta_{real}/(1-\alpha_{real}) \quad (16)$$

$\alpha_{real}$ and $\beta_{real}$ are the real values for the given test.

Because of the discrete nature of the solution field and its thinness (rare and widely-scattered points) in the short-test domain, the effectiveness of the standard optimization programs is rather low. In these circumstances, the search for the solution covers all possible combinations of the test parameters ($\alpha^*$, $\beta^*$, $r_{nMax}$, $r_{bMax}$). Given the teachings herein, as well as Michlin, Y. H., Grabarnik, G., Leshchenko, E., Comparison Sequential Testing for Reliability: Optimal Truncation of Short Tests, *JSM* 2007, *Statistics: Harnessing the Power of Information*. American Statistical Association, Salt Lake City, Utah, (Jul. 29-Aug. 2, 2007), the skilled artisan will appreciate that, for choosing the optimal solution, two criteria can be adopted: $R_D$ and $R_{ASN}$. $R_D$ represents the closeness of the test OC to its specified counterpart:

$$R_D = \sqrt{((\alpha_{real}-\alpha)/\alpha)^2 + ((\beta_{real}-\beta)/\beta)^2} \quad (17)$$

where $\alpha_{real}$, and $\beta_{real}$ are the real values computed by (5) for the prescribed stopping boundaries dictated by the values of $\alpha^*$ and $\beta^*$.

$R_{ASN}$ represents the percentage excess of ASN($\Phi$) of the truncated over the non-truncated test:

$$R_{ASN} = 100\% \left[ \sum_{i=1}^{5} ASN(\Phi_i) - \sum_{i=1}^{5} ASN_{nTr}(\Phi_i) \right] / \sum_{i=1}^{5} ASN_{nTr}(\Phi_i) \quad (18)$$

where:

$\Phi_i$ are values of $\Phi$ forming the following geometric progression:

$$\Phi_0/(\sqrt{d})^3, \Phi_0/(\sqrt{d})^2 = \Phi_1, \Phi_0/\sqrt{d}, \Phi_0, \Phi_0\sqrt{d} \quad (19)$$

ASN($\Phi_i$) is the ASN calculated by the recursive method (6); ASN$_{nTr}$($\Phi_i$) is the value calculated as per (14) at the same $\alpha_{real}$ and $\beta_{real}$ as for the truncated test.

According to the aforementioned Michlin, Grabarnik, and Leshchenko paper, the preferable $R_{ASN}$ values are 5% and 10%.

Figure 3:
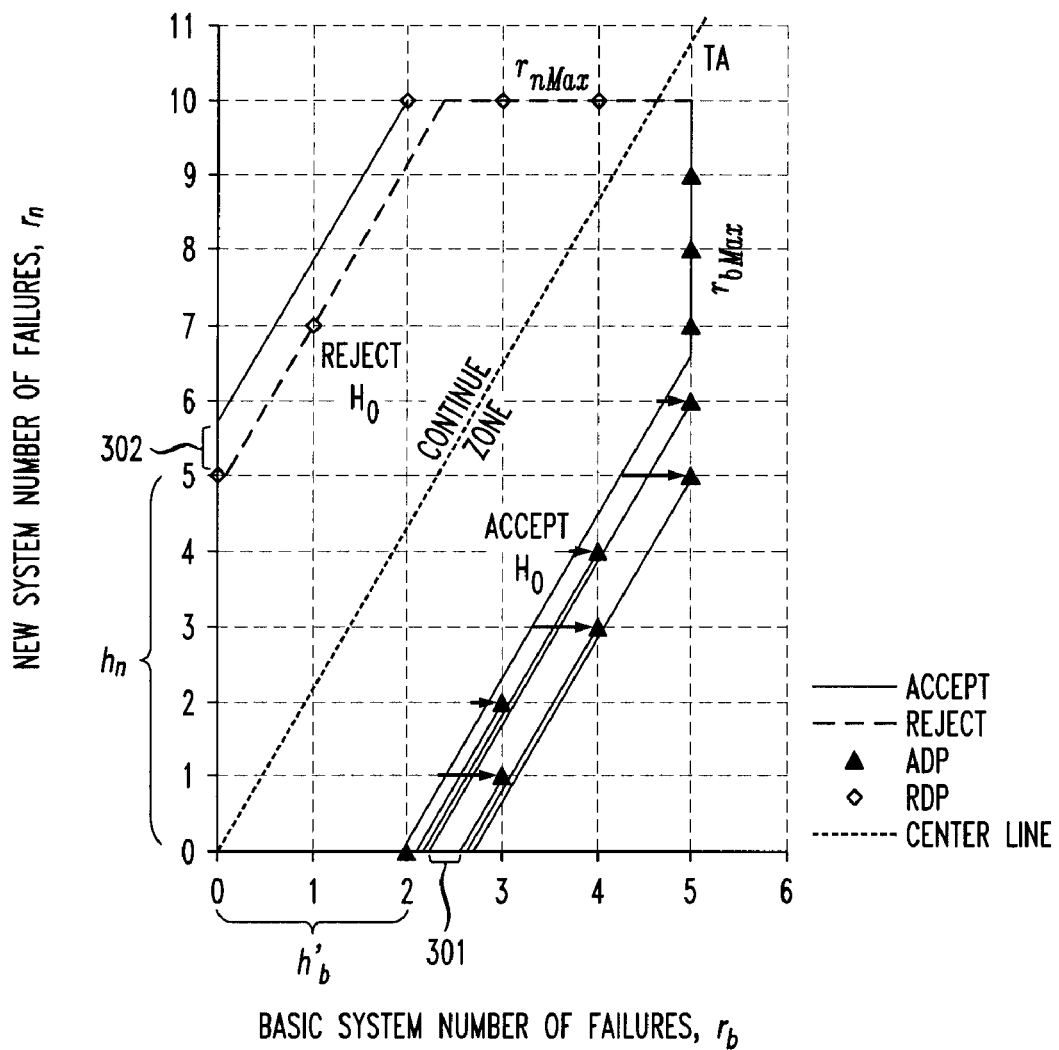
FIG. 3 shows another exemplary test plane.

Reference should now be had to FIG. 3. Reference character 301 depicts an example of an interval of h'$_b$ values over which the test ADPs do not change, while reference character 302 depicts the same for h$_n$ and RDPs. Let s be a slope of the series of straight lines parallel to the accept (reject) line(s). Let s=[a$_0$, a$_1$, a$_2$, a$_3$, ... ] be a continuous fraction decomposition of s and r$_n$=P$_n$/Q$_n$ be the n-th approaching fraction.

Theorem: There exists an n such that if one replaces slope s with r$_n$=P$_n$/Q$_n$ the entire graph remains the same. This means that both the number of jump points on both axes and the order of the coordinate points will stay the same under slope replacement, while the sizes of the jump behave continuously with respect to slope replacement.

Corollary: Under sufficiently closed replacement, one can replace precise calculation on approximate calculations and the graph remains the same; jumps in values of alpha and beta will change continuously.

Standard search programs for minima operate poorly, or not at all, with discrete data of the type in question. Known regularities in the behavior of the functions $\alpha$, $\beta$, $R_{ASN}$, $R_D$ make it possible to develop a fast technique. These known regularities are:

The discrete monotonic dependences of $\alpha$, $\beta$ and $R_{ASN}$ on h'$_b$ and h$_n$.

The values of h'$_b$ and h$_n$ at which the test characteristics change.

Almost-plane dependences over large intervals of h'$_b$ and h$_n$, stepwise over small ones.

Stronger dependence of $\alpha$ on h$_n$ than on h'$_b$; the reverse for $\beta$.

Figure 4:
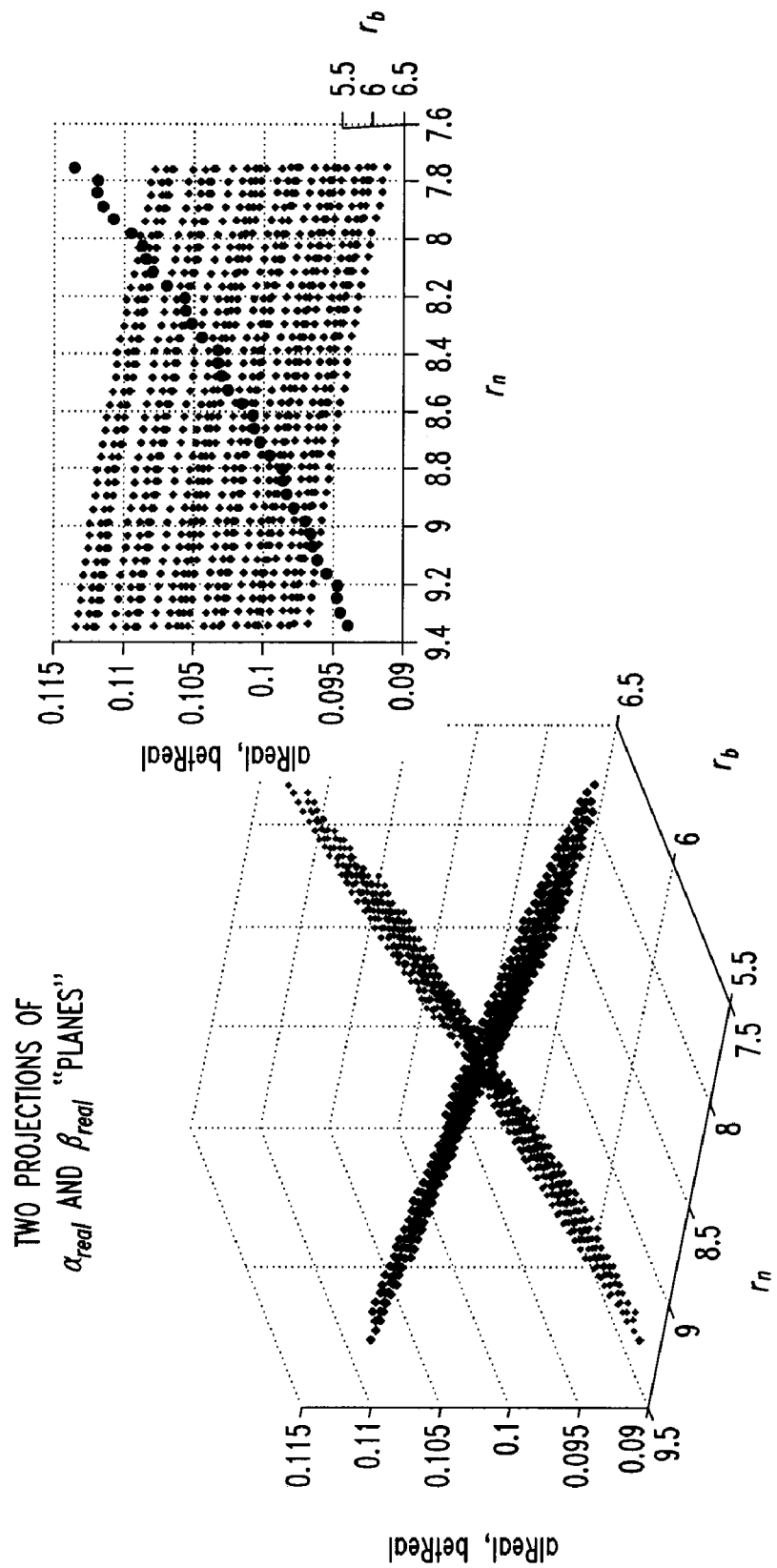
FIG. 4 shows two exemplary projections of $\alpha_{real}$ and $\beta_{real}$ "planes"
Figure 5:
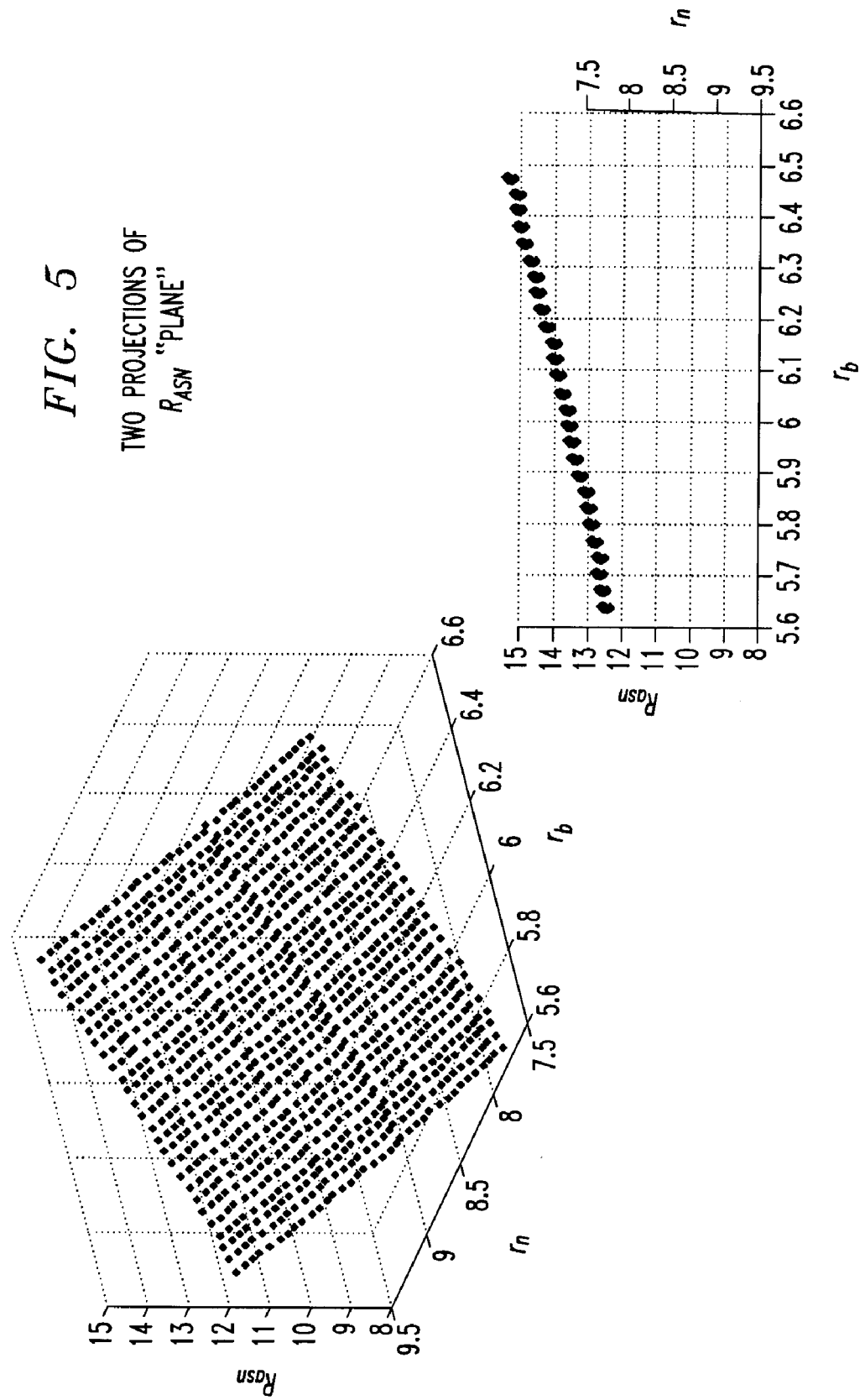
FIG. 5 shows two exemplary projections of an $R_{ASN}$ "plane"
Figure 6:
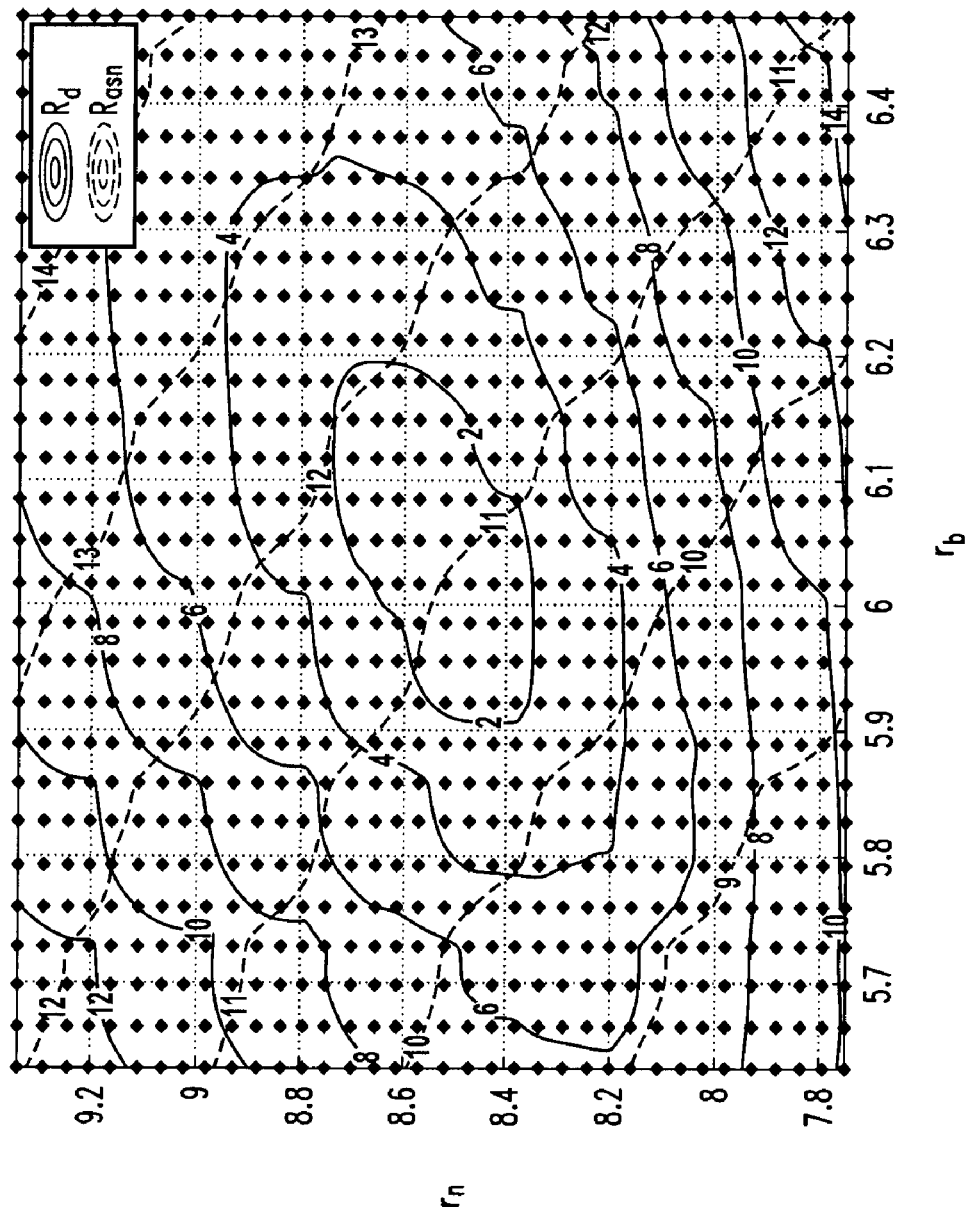
FIG. 6 shows an exemplary relationship between errors of the first order and errors of the second order.

FIG. 4 depicts two projections of $\alpha_{real}$ and $\beta_{real}$ "planes." These parameters represent, respectively, the actual errors of the first and second orders. The projections are not, strictly speaking, planar, but they are near-planar and hence referred to herein as plane-like or "planes." FIG. 5 depicts two projections of the $R_{ASN}$ "plane." The parameter rb represents the number of failures of the basic system while the parameter rn represents the number of failures of the new system. Rasn refers to the average sample number based on the two parameters. That is, FIG. 5 shows a three-dimensional plot of the average sample number for any given number of failures of the basic and new systems, respectively. Again, the plot is not, strictly speaking, planar, but is near-planar and hence referred to herein as plane-like or a "plane." FIG. 6 shows the relationship between errors of the first order and errors of the second order. In particular, there are two different kinds of graphs. The continuous line graph depicts Rd (potential level of parameter d) while the broken line graph depicts Rasn (potential level of average sample number).

Figure 7:
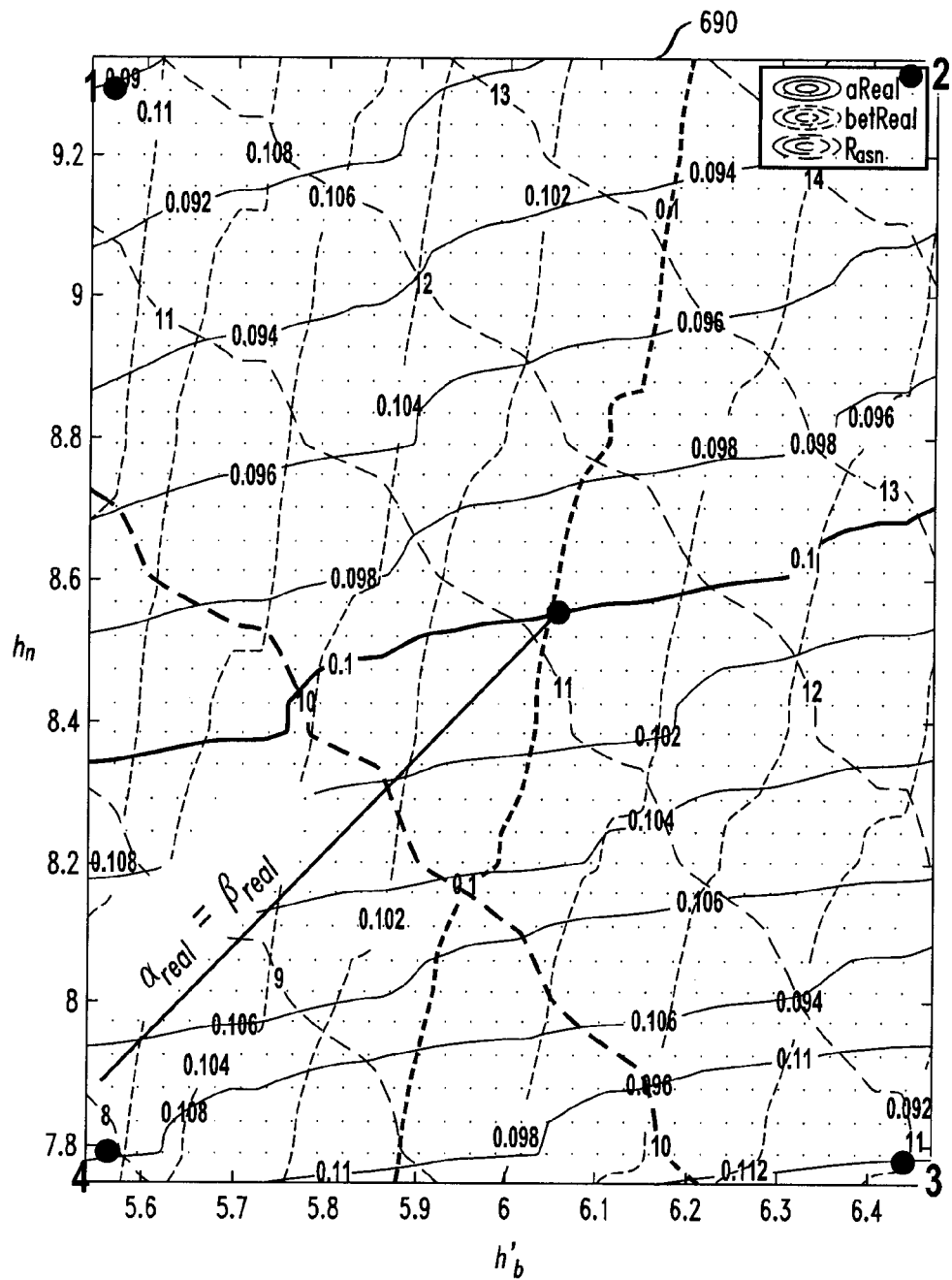
FIGS. 7 and 8 show aspects of an exemplary search scheme for $\min(R_D)$.
Figure 8:
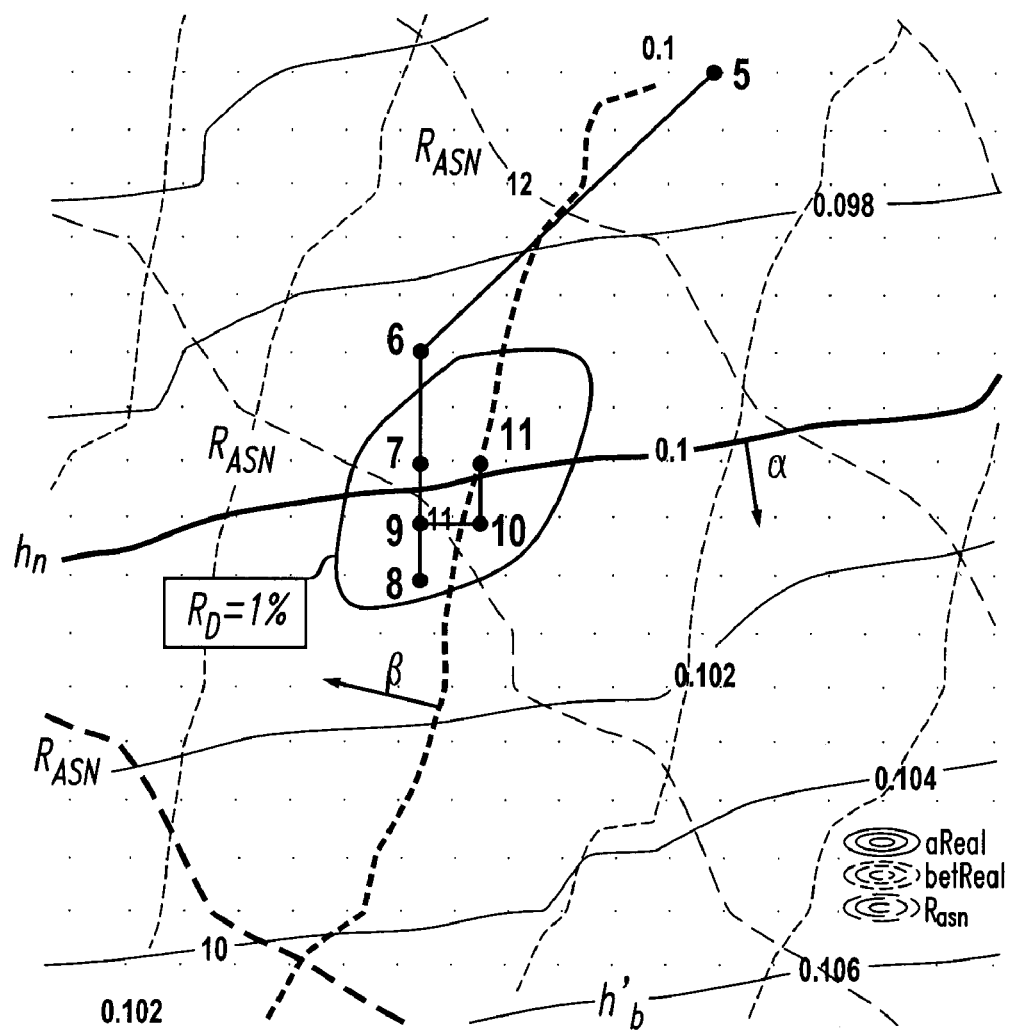

FIGS. 7 and 8 show aspects of an exemplary search scheme for min(R$_D$).

Figure 10:
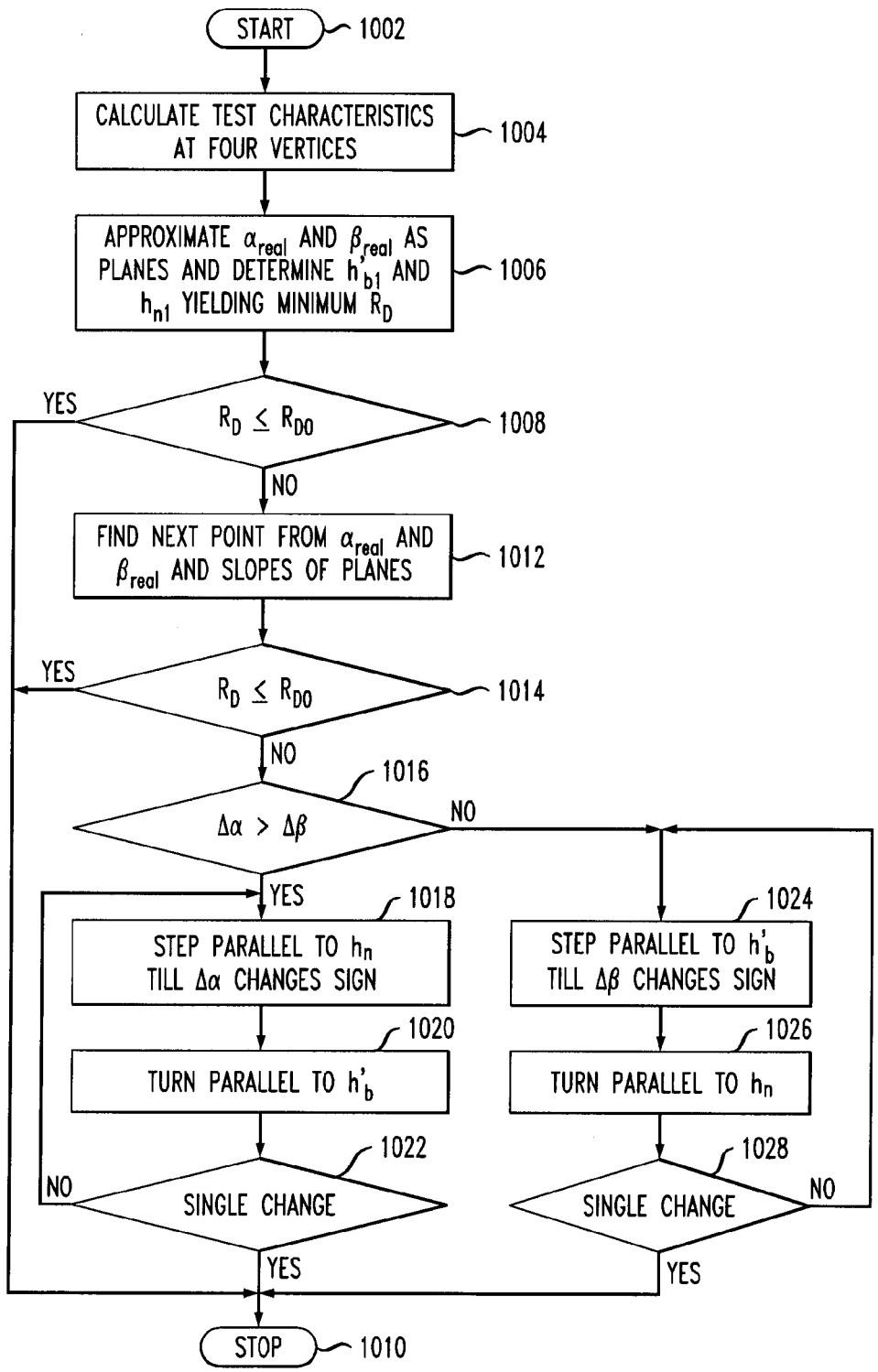
FIG. 10 shows a flow chart of an exemplary method, according to another aspect of the invention.
Figure 12:
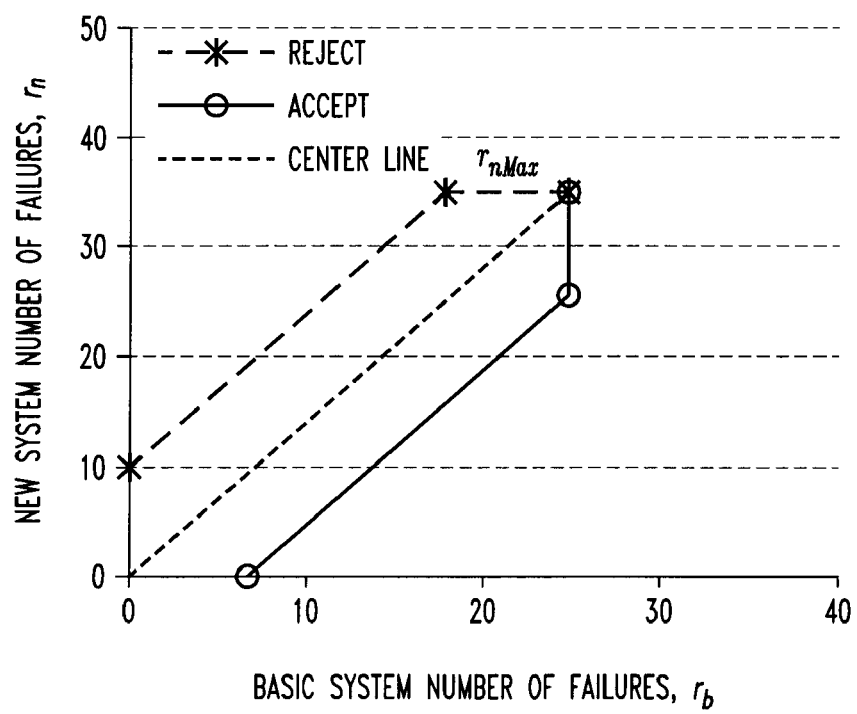
FIG. 12 shows exemplary starting rectangle determination.

An exemplary search technique will now be described, with reference to FIGS. 7, 8, and 10. In FIG. 10, processing begins at 1002. In a first stage, as seen in FIG. 7 and at step 1004, calculate the test characteristics at the four vertices 1, 2, 3, 4 of a rectangle 690, whose coordinates are obtained from the relationships presented in the aforementioned Michlin and Grabarnik RelStat '05 paper. In particular, as shown in FIG. 12, a diagonal is drawn through (0,0) parallel to the SPRT boundaries; a horizontal segment of REJECT is drawn at the rnMax level until it meets the diagonal, at which point a vertical segment of ACCEPT is drawn downwards. The rectangle is then completed with additional sides parallel to those just drawn (omitted from figure to avoid clutter). Next, approximate $\alpha_{real}$(h'$_b$, h$_n$) and $\beta_{real}$(h'$_b$, h$_n$) as planes, and determine the first estimate h'$_{b1}$, h$_{n1}$ yielding min R$_D$ as shown at point 5 in FIG. 8 and at step 1006. In step 1008, check for R$_D$=R$_{D0}$, and if satisfied, stop the search at 1010. Note that points 5-11 in FIG. 8 are the points of the test characteristics calculation.

In a second stage seen at step 1012, determine point 6 from $\alpha_{real}$, $\beta_{real}$ and the slopes of the $\alpha$- and $\beta$-planes as per determination of point 5 in step 1006. In step 1014, recheck for R$_D$=R$_{D0}$. Stop if satisfied, else continue to step 1016.

In a third stage as per steps 1016-1028, carry out an alternating advance parallel to the h'$_b$- and h$_n$-axes. In view of the discreteness and complexity of the R$_D$ function, the search for its minimum can be reduced, in one or more embodiments, to one for the points h'$_b$ and h$_n$ where $\Delta\alpha$ and $\Delta\beta$ simultaneously undergo a change of sign. This problem is easier to solve, as both $\Delta\alpha$ and $\Delta\beta$ are monotonic functions of the coordinates. The term "root" refers here to one of a pair of adjoining points at which the function changes its sign and has the smaller absolute value.

The search can be stopped at any step, subject to $R_D=R_{D0}$ (i.e., once the condition $R_D=R_{D0}$ is satisfied, the search can be stopped). Decision blocks like blocks 1008 and 1014 have been omitted from the steps for the third stage to avoid cluttering the flow chart.

As shown at decision block 1016, if, at point 6, $\Delta\alpha_6 > \Delta\beta_6$, a path parallel to the $h_n$-axis is taken (in step 1018) in uniform steps $\Delta h_n$ (here, to point 7 and then point 8), until $\Delta\alpha$ changes its sign, $\Delta h_n = \Delta\alpha_6/\alpha_3$, where $\alpha_3$ is the coefficient in the equation of the $\alpha$-plane as per the approximation discussed above with respect to point 5 and step 1006. Beyond that point, the root $\Delta$ ($h_n$) is searched for by the regula falsi method. As will be appreciated by the skilled artisan, in numerical analysis, the false position method or regula falsi method is a root-finding algorithm that combines features from the bisection method and the secant method. Given the teachings herein, the skilled artisan will be able to adapt same to implement one or more embodiments of the invention. A special feature of this procedure is accounting for the discreteness of the solution.

At the point 9 of the root $\Delta\alpha$, a right-angled turn is executed and a path parallel to the $h'_b$-axis is taken, as per step 1020, searching for the $\Delta\beta$ root, resulting in point 10. The alternating procedure is continued until a situation is reached where two consecutive turns involve a single change in the test, as at block 1022. This point 11 corresponds to $\min(R_D)$. If, in the procedure as described with regard to point 6, $\Delta\alpha6 < \Delta\beta6$ as per the "NO" branch of block 1016, instead step parallel to $h'_b$ as per step 1024 until $\Delta\beta$ changes sign and then turn parallel to $h_n$ in step 1026, again looking for a case where two consecutive turns involve a single change as in block 1028, in a manner wholly analogous to steps 1018-1022.

Note that FIG. 8 is an example of the search scheme for $\min(R_D)$, and that points 5-11 are points of test characteristic calculation.

Figure 9A:
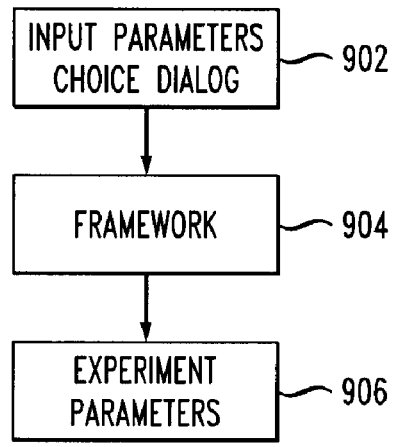
FIGS. 9A and 9B show exemplary system block diagrams, according to two aspects of the invention, for an experiment advisory system and an autonomous experiment system, respectively.

FIG. 9A shows a system block diagram of an experiment advisory system, according to an aspect of the invention. An input parameters choice dialog 902 is provided; for example, using a suitable input/output module such as a user interface (including, for example, a graphical user interface (GUI)). The framework module 904 carries out the operations described herein, based on the input parameters. The result is the experiment parameters 906, which may be output, for example, using the aforementioned GUI or other input/output module.

Figure 9B:
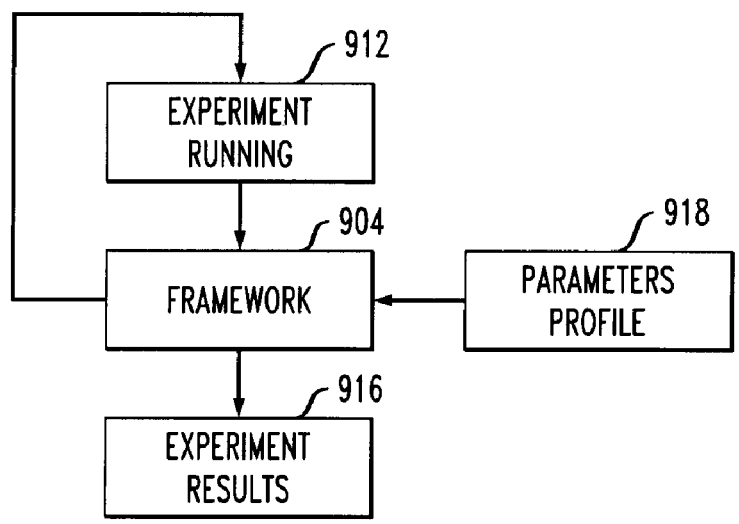

FIG. 9B shows a system block diagram of an exemplary autonomous experiment system. As shown in block 912, an experiment is running, possibly under computer control. Framework 904, based on suitable parameters 918 (obtained, for example, as described with respect to block 902), monitors experiment 912 and stops testing when, according to the framework 904, further sample points are no longer needed. The experimental results are output at 916; for example, using a suitable GUI or other input/output module.

Figure 14:
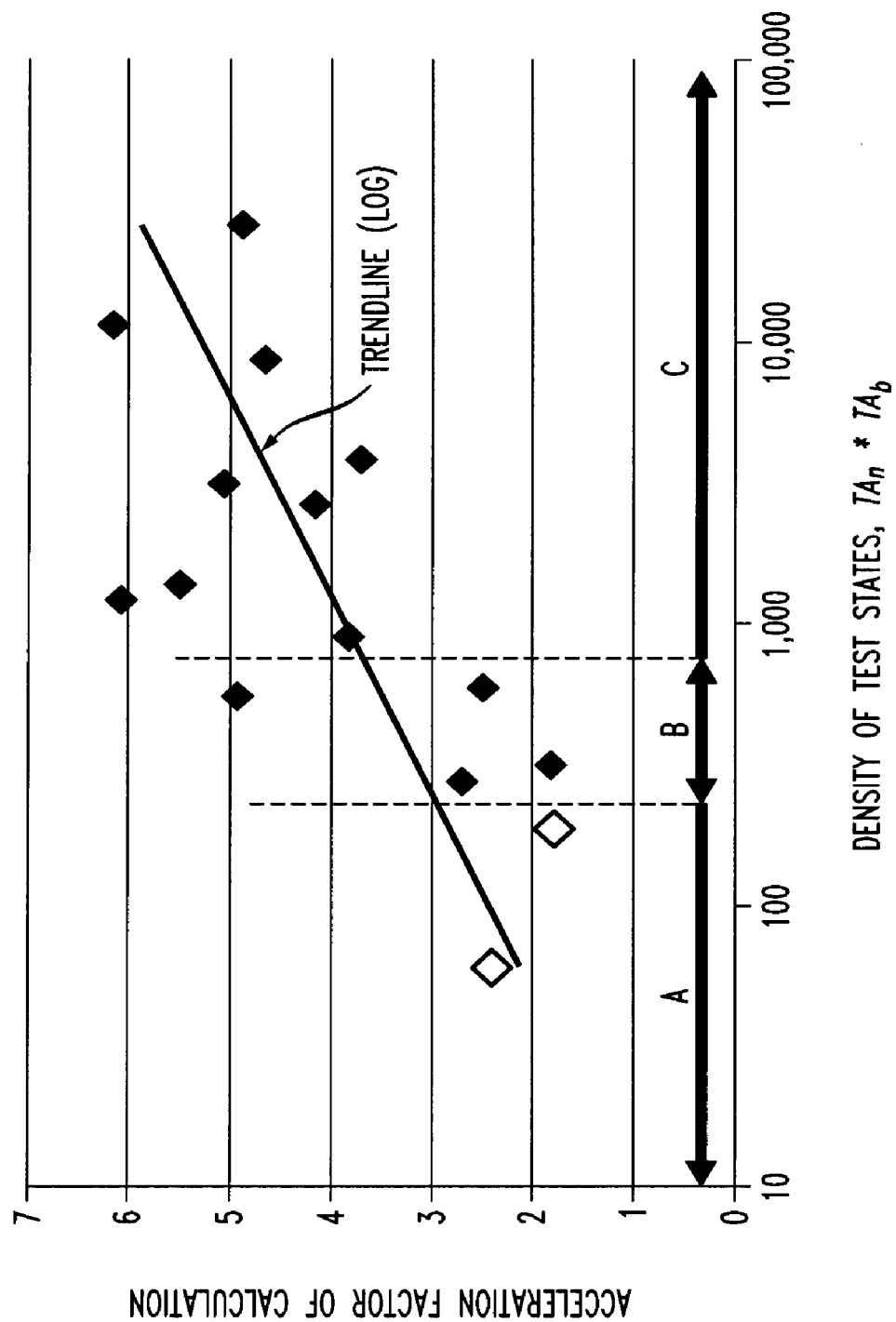
FIG. 14 shows exemplary effectiveness of one or more embodiments of a search framework, according to yet another aspect of the invention.

FIG. 14 shows non-limiting exemplary results for the effectiveness of one exemplary embodiment of search framework, according to an aspect of the invention, it being understood that other embodiments may have different results. In zone A, short tests, a standard search program, such as a kind intended to find the minimum of an unconstrained multivariable function using a derivative-free method, may sometimes fail to find the minimum. Zone B represents medium duration tests. Zone C represents long tests. The density of the test states is estimated according to the product of Truncation-Apex coordinates. The acceleration factor of the calculation represents the ratio of the number of calculations with the fminsearch technique (fminsearch from the MatLab® software of The MathWorks, Inc. Natick, Mass., USA) as compared to an embodiment of the invention.

Given the discussion thus far, it will be appreciated that, in general terms, an exemplary method, according to an aspect of the invention, includes determining test characteristics at vertices of a rectangle defined on a sequential probability ratio test plot of a number of failures of a new physical system versus a number of failures of a baseline physical system, as per step 1004. The method also includes, based on the test characteristics, approximating errors of first and second orders as planes, as per step 1006. The method still further includes, based on the approximating step, estimating intercepts of accept and reject boundaries, also as per step 1006. The intercept of the accept boundary is the aforementioned $h'_b$ (point where the accept line intercepts the horizontal axis), while the intercept of the reject boundary is the aforementioned $h_n$ (point where the reject line intercepts the vertical axis).

Yet a further step includes, based on slopes of the planes and actual values of the errors of the first and second orders, determining a starting point (e.g., point 5) on a graph of values of an intercept of the reject boundary and values of an intercept of the accept boundary, as per step 1012. Furthermore, an additional step includes determining a minimum of an operating characteristic function $R_D$ by alternative advances, commencing at the starting point, parallel to an axis representing the accept boundary intercept $h'_b$ and an axis representing the reject boundary intercept $h_n$.

As discussed elsewhere, the new physical system and the baseline physical system could be, for example, manufacturing systems, such as semiconductor manufacturing systems, or systems analyzing scores of human test subjects.

As in FIG. 9A, in some instances, an additional aspect 902 includes obtaining input parameters (namely, alpha and beta, the errors of the first and second type, respectively), the framework 904 employs same, and experiment parameters are output at 906 based on the determining of the minimum. As in FIG. 9B, in some instances additional aspect 918 includes obtaining a parameter profile and additional aspect 912 includes monitoring results of an experiment (for example, with suitable sensors connected to a computer system). Framework 904 operates based upon the input parameter profile, and the experiment is stopped and experimental results output based on the minimum of the operating characteristic function.

With regard to the aforementioned parameter profile, in one non-limiting example, if there are different expectations of improvements for different type of chips, in this case the parameter profile will contain alpha and beta per each type of chip. Another non-limiting example is default values of alpha and beta As per steps 1016-1022, in some instances, the determining of the minimum includes, if a change in the error of the first order is greater than a change in the error of the second order (YES branch of 1016), proceeding first parallel to the axis representing the reject boundary intercept $h_n$; upon a change in sign of the change in the error of the first order, employ a modified regula falsi method; then proceed parallel to the axis representing the accept boundary intercept $h'_b$; and repeat the steps until two consecutive turns involve a single test change.

As per steps 1016 and 1024-1028, in some instances, the determining of the minimum includes, if a change in the error of the first order is less than a change in the error of the second order (NO branch of 1016), proceeding first parallel to the axis representing the accept boundary intercept $h'_b$; upon a change in sign of the change in the error of the second order, employ a modified regula falsi method; then proceed parallel to the axis representing the reject boundary intercept $h_n$; and repeat the steps until two consecutive turns involve a single test change.

As at 1008, 1012, and implicit in the steps 1016-1028, a further step includes periodically checking whether the operating characteristic function is less than a specified value.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 11:
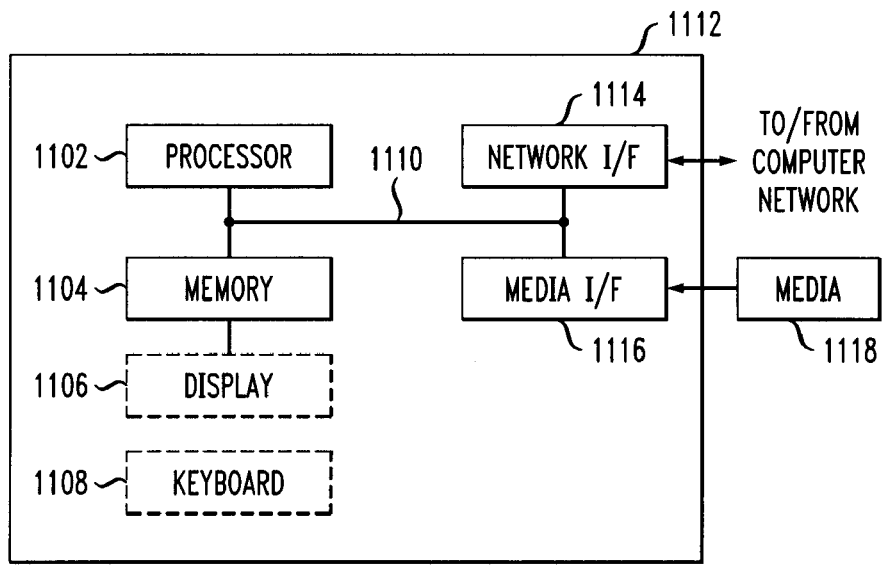
FIG. 11 depicts a computer system that may be useful in implementing one or more aspects and/or elements of the invention.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1118 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, first, second, and third phase modules to carry out the first, second, and third stages discussed above, a suitable input/output module (optionally with GUI), a data acquisition and control module to acquire experimental data and shut down an experiment when the framework indicates this is appropriate, and so on. The method steps can then be carried out using the distinct software modules and/or sub-modules of the system, as described above, executing on one or more hardware processors 1102. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising the steps of:
    determining test characteristics at vertices of a rectangle defined on a sequential probability ratio test plot of a number of failures of a new physical system versus a number of failures of a baseline physical system;
    based on said test characteristics, approximating errors of first and second orders as planes;
    based on said approximating step, estimating intercepts of accept and reject boundaries;
    based on slopes of said planes and actual values of said errors of said first and second orders, determining a starting point on a graph of values of an intercept of said reject boundary and values of an intercept of said accept boundary; and determining a minimum of an operating characteristic function by alternating advances, commencing at said starting point, parallel to an axis representing said accept boundary intercept and an axis representing said reject boundary intercept, wherein one or more steps of said method are performed by one or more hardware devices.

2. The method of claim 1, wherein said new physical system and said baseline physical system each comprise manufacturing systems.

3. The method of claim 2, wherein said manufacturing systems comprise semiconductor manufacturing systems.

4. The method of claim 1, wherein said new physical system and said baseline physical system each comprise a system analyzing scores of human test subjects.

5. The method of claim 1, further comprising obtaining input parameters, wherein at least said determining of said minimum is based upon said input parameters, and further comprising outputting experiment parameters based on said determining of said minimum.

6. The method of claim 1, further comprising:
obtaining a parameter profile; and
monitoring results of an experiment;
wherein at least said determining of said minimum is based upon said input parameter profile;
further comprising ceasing said experiment and outputting experimental results based on said minimum of said operating characteristic function.

7. The method of claim 1, wherein said determining of said minimum comprises:
if a change in said error of said first order is greater than a change in said error of said second order, proceeding first parallel to said axis representing said reject boundary intercept;
upon a change in sign of said change in said error of said first order, employing a modified regula falsi method;
then proceeding parallel to said axis representing said accept boundary intercept; and
repeating said steps of proceeding parallel to said axis representing said reject boundary intercept, employing said modified regula falsi method, and proceeding parallel to said axis representing said accept boundary intercept, until two consecutive turns involve a single test change.

8. The method of claim 1, wherein said determining of said minimum comprises:
if a change in said error of said first order is less than a change in said error of said second order, proceeding first parallel to said axis representing said accept boundary intercept;
upon a change in sign of said change in said error of said second order, employing a modified regula falsi method;
then proceeding parallel to said axis representing said reject boundary intercept; and
repeating said steps of proceeding parallel to said axis representing said accept boundary intercept, employing said modified regula falsi method, and proceeding parallel to said axis representing said reject boundary intercept, until two consecutive turns involve a single test change.

9. The method of claim 1, further comprising periodically checking whether said operating characteristic function is less than a specified value.

10. The method of claim 1, further comprising providing a system, wherein the system comprises distinct software modules, each of the distinct software modules being embodied on a computer-readable storage medium, and wherein the distinct software modules comprise a first phase module, a second phase module, and a third phase module;
wherein:
said determining of said test characteristics is carried out by said first phase module executing on at least one hardware processor;
said approximating of said errors of first and second orders is carried out by said first phase module executing on said at least one hardware processor;
said estimating of said intercepts of said accept and reject boundaries is carried out by said first phase module executing on said at least one hardware processor;
said determining of said starting point is carried out by said second phase module executing on said at least one hardware processor; and
said determining of said minimum is carried out by said third phase module executing on said at least one hardware processor.

11. A computer program product comprising a non-transitory computer readable recordable storage medium having computer readable program code embodied therewith, said computer readable program code comprising:
computer readable program code configured to determine test characteristics at vertices of a rectangle defined on a sequential probability ratio test plot of a number of failures of a new physical system versus a number of failures of a baseline physical system;
computer readable program code configured to, based on said test characteristics, approximate errors of first and second orders as planes;
computer readable program code configured to, based on said approximating, estimating intercepts of accept and reject boundaries;
computer readable program code configured to, based on slopes of said planes and actual values of said errors of said first and second orders, determine a starting point on a graph of values of an intercept of said reject boundary and values of an intercept of said accept boundary; and
computer readable program code configured to determine a minimum of an operating characteristic function by alternating advances, commencing at said starting point, parallel to an axis representing said accept boundary intercept and an axis representing said reject boundary intercept.

12. The computer program product of claim 11, further comprising computer readable program code configured to obtain input parameters, wherein at least said determining of said minimum is based upon said input parameters, and further comprising computer readable program code configured to output experiment parameters based on said determining of said minimum.

13. The computer program product of claim 11, further comprising:
computer readable program code configured to obtain a parameter profile; and
computer readable program code configured to monitor results of an experiment;
wherein at least said determining of said minimum is based upon said input parameter profile;
further comprising computer readable program code configured to cause said experiment to cease and to output experimental results based on said minimum of said operating characteristic function.

14. The computer program product of claim 11, wherein said computer readable program code configured to determine said minimum comprises:
- computer readable program code configured to, if a change in said error of said first order is greater than a change in said error of said second order, proceed first parallel to said axis representing said reject boundary intercept;
- computer readable program code configured to, upon a change in sign of said change in said error of said first order, employ a modified regula falsi method;
- computer readable program code configured to then proceed parallel to said axis representing said accept boundary intercept; and
- computer readable program code configured to repeat said proceeding parallel to said axis representing said reject boundary intercept, said employing of said modified regula falsi method, and said proceeding parallel to said axis representing said accept boundary intercept, until two consecutive turns involve a single test change.

15. The computer program product of claim 11, wherein said computer readable program code configured to determine said minimum comprises:
- computer readable program code configured to, if a change in said error of said first order is less than a change in said error of said second order, proceed first parallel to said axis representing said accept boundary intercept;
- computer readable program code configured to, upon a change in sign of said change in said error of said second order, employ a modified regula falsi method;
- computer readable program code configured to then proceed parallel to said axis representing said reject boundary intercept; and
- computer readable program code configured to repeat said proceeding parallel to said axis representing said accept boundary intercept, said employing of said modified regula falsi method, and said proceeding parallel to said axis representing said reject boundary intercept, until two consecutive turns involve a single test change.

16. The computer program product of claim 11, further comprising computer readable program code configured to periodically check whether said operating characteristic function is less than a specified value.

17. An apparatus comprising:
- a memory; and
- at least one processor, coupled to said memory, and operative to:
  - determine test characteristics at vertices of a rectangle defined on a sequential probability ratio test plot of a number of failures of a new physical system versus a number of failures of a baseline physical system;
  - based on said test characteristics, approximate errors of first and second orders as planes;
  - based on said approximating, estimate intercepts of accept and reject boundaries;
  - based on slopes of said planes and actual values of said errors of said first and second orders, determine a starting point on a graph of values of an intercept of said reject boundary and values of an intercept of said accept boundary; and
  - determine a minimum of an operating characteristic function by alternating advances, commencing at said starting point, parallel to an axis representing said accept boundary intercept and an axis representing said reject boundary intercept.

18. The apparatus of claim 17, wherein said at least one processor is further operative to obtain input parameters, wherein at least said determining of said minimum is based upon said input parameters, and wherein said at least one processor is further operative to output experiment parameters based on said determining of said minimum.

19. The apparatus of claim 17, wherein said at least one processor is further operative to:
- obtain a parameter profile; and
- monitor results of an experiment;
- wherein at least said determining of said minimum is based upon said input parameter profile;
- wherein said at least one processor is further operative to cause said experiment to cease and to output experimental results based on said minimum of said operating characteristic function.

20. The apparatus of claim 17, wherein said at least one processor is operative to determine said minimum by:
- if a change in said error of said first order is greater than a change in said error of said second order, proceeding first parallel to said axis representing said reject boundary intercept;
- upon a change in sign of said change in said error of said first order, employing a modified regula falsi method;
- then proceeding parallel to said axis representing said accept boundary intercept; and
- repeating said steps of proceeding parallel to said axis representing said reject boundary intercept, employing said modified regula falsi method, and proceeding parallel to said axis representing said accept boundary intercept, until two consecutive turns involve a single test change.

21. The apparatus of claim 17, wherein said at least one processor is operative to determine said minimum by:
- if a change in said error of said first order is less than a change in said error of said second order, proceeding first parallel to said axis representing said accept boundary intercept;
- upon a change in sign of said change in said error of said second order, employing a modified regula falsi method;
- then proceeding parallel to said axis representing said reject boundary intercept; and
- repeating said steps of proceeding parallel to said axis representing said accept boundary intercept, employing said modified regula falsi method, and proceeding parallel to said axis representing said reject boundary intercept, until two consecutive turns involve a single test change.

22. The apparatus of claim 17, wherein said at least one processor is further operative to periodically check whether said operating characteristic function is less than a specified value.

23. The apparatus of claim 17, further comprising a plurality of distinct software modules, each of the distinct software modules being embodied on a computer-readable storage medium, and wherein the distinct software modules comprise a first phase module, a second phase module, and a third phase module;
- wherein:
  - said at least one processor is operative to determine said test characteristics by executing said first phase module;
  - said at least one processor is operative to approximate said errors of first and second orders by executing said first phase module;
  - said at least one processor is operative to estimate said intercepts of said accept and reject boundaries by executing said first phase module;
  - said at least one processor is operative to determine said starting point by executing said second phase module; and said at least one processor is operative to determine said minimum by executing said third phase module.

24. An apparatus comprising:

means for determining test characteristics at vertices of a rectangle defined on a sequential probability ratio test plot of a number of failures of a new physical system versus a number of failures of a baseline physical system;

means for, based on said test characteristics, approximating errors of first and second orders as planes;

means for, based on said approximating step, estimating intercepts of accept and reject boundaries;

means for, based on slopes of said planes and actual values of said errors of said first and second orders, determining a starting point on a graph of values of an intercept of said reject boundary and values of an intercept of said accept boundary; and means for determining a minimum of an operating characteristic function by alternating advances, commencing at said starting point, parallel to an axis representing said accept boundary intercept and an axis representing said reject boundary intercept.

* * * * *